United States Patent
Pyzio

(10) Patent No.: US 7,029,530 B2
(45) Date of Patent: Apr. 18, 2006

(54) METHOD AND APPARATUS FOR INFLATABLE TIRE SOAPER

(75) Inventor: Arkadiusz Pyzio, Warren, MI (US)

(73) Assignee: Dominion Technologies Group, Inc., Roseville, MI (US)

( * ) Notice: Subject to any disclaimer, the term of this patent is extended or adjusted under 35 U.S.C. 154(b) by 179 days.

(21) Appl. No.: 10/256,647

(22) Filed: Sep. 27, 2002

(65) Prior Publication Data

US 2004/0060509 A1    Apr. 1, 2004

(51) Int. Cl.
*B05B 7/06*    (2006.01)
(52) U.S. Cl. .................. 118/315; 118/324; 118/602
(58) Field of Classification Search ............ 118/205, 118/315, 313, 316, 602, 324; 134/123, 131, 134/128, 129; 29/894.31
See application file for complete search history.

(56) References Cited

U.S. PATENT DOCUMENTS

| | | | | |
|---|---|---|---|---|
| 2,763,575 A | * | 9/1956 | Bede ........................ | 427/422 |
| 3,336,635 A | * | 8/1967 | Soderquist ................ | 425/33 |
| 3,748,049 A | * | 7/1973 | Knupfer et al. ............ | 401/9 |
| 4,863,650 A | * | 9/1989 | Kohler et al. ............. | 264/39 |

\* cited by examiner

*Primary Examiner*—Brenda A. Lamb
(74) *Attorney, Agent, or Firm*—Harness, Dickey & Pierce, P.L.C.

(57) ABSTRACT

A method and apparatus are provided for soaping a tire using an inflatable bladder. The inflatable bladder is extended through a center opening in a tire and inflated to cause soap on the surface of the bladder to soap the inner surface of the tire. The bladder is then deflated and removed from the opening in the tire so that the tire can be subsequently mounted to a wheel.

18 Claims, 6 Drawing Sheets

METHOD AND APPARATUS FOR INFLATABLE TIRE SOAPER

FIELD OF THE INVENTION

The present invention relates to apparatus for automated tire assembly and more particularly, to an inflatable tire soaper for use in an automated tire installation system.

BACKGROUND OF THE INVENTION

During assembly of a tire onto a wheel, the exterior surface of the tire that comes into contact with the outer flange of the wheel is often wetted or "soaped" in order to enhance the seal that is obtained between the outer surface of the tire and the wheel. In order to ensure a proper seal to allow inflation of the tire, it is desirable to provide a substantially evenly wetted surface around the inboard and outboard sides of the tire. Previously, the soaping of the tire has been achieved both manually and automatically. Manual application of the soap or other liquid can be achieved by use of a brush, sponge, or sprayer. Automated methods have also used wetted brushes and/or sprayers. It is desirable in the art to provide a tire soaper that functions automatically to evenly distribute the soap on the inboard and outboard sides of the tire and that is capable of containing the excess soap for re-use.

SUMMARY OF THE INVENTION

These and other objects of the present invention are obtained by providing an inflatable bladder which can be wetted with a soap or other sealing enhancement material. The bladder can be inflated inside the opening in a tire so as to expand outward and contact the surface around the opening in the tire to evenly distribute the soap from the bladder onto the surface of the tire. The bladder can then be deflated and removed from the opening in the tire so that the tire can be subsequently mounted to a wheel in a manner as is known in the art.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
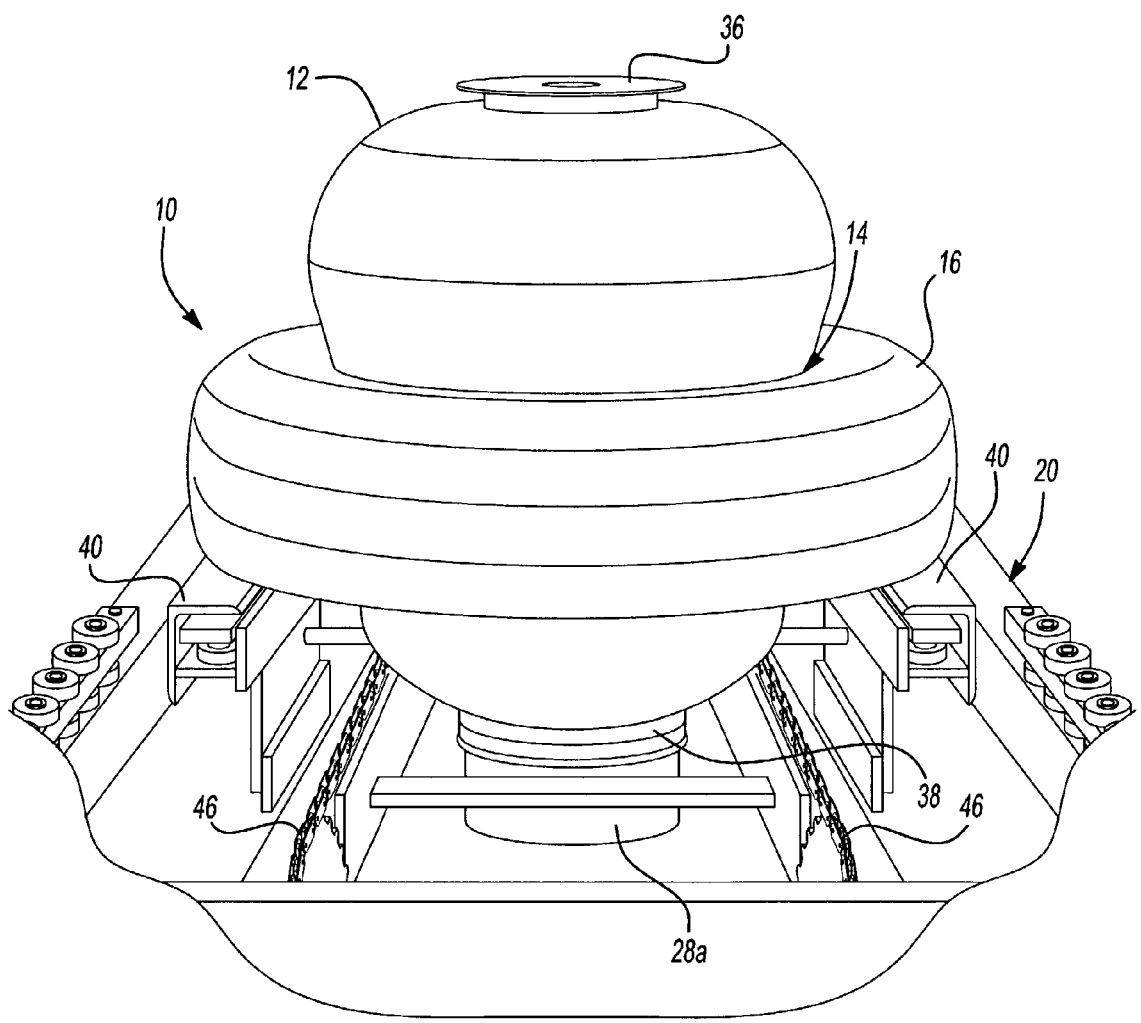
FIG. 1 is a perspective view of an inflatable tire soaper according to the principles of the present invention.

With reference to FIG. 1, an inflatable tire soaper 10 will now be described. The inflatable tire soaper 10 includes a bladder 12 which can be wetted with a liquid such as liquid soap or another sealing enhancement liquid material, hereinafter referred to as soap. The bladder 12 is inserted into an opening 14 in a tire 16 and is inflated, causing the bladder to expand outwardly and come into contact with the inner peripheral surface of the tire 16 that contacts the wheel when assembled. The liquid from the bladder 12 wets the surface around the opening 14 in the tire 16 in an evenly distributed manner without excess liquid being distributed. The tire 16 is then properly wetted and ready to be mounted to a wheel as is known in the art. With reference to the accompanying drawings, the inflatable tire soaper 10 according to the principles of the present invention will now be described in greater detail.

Figure 2A:
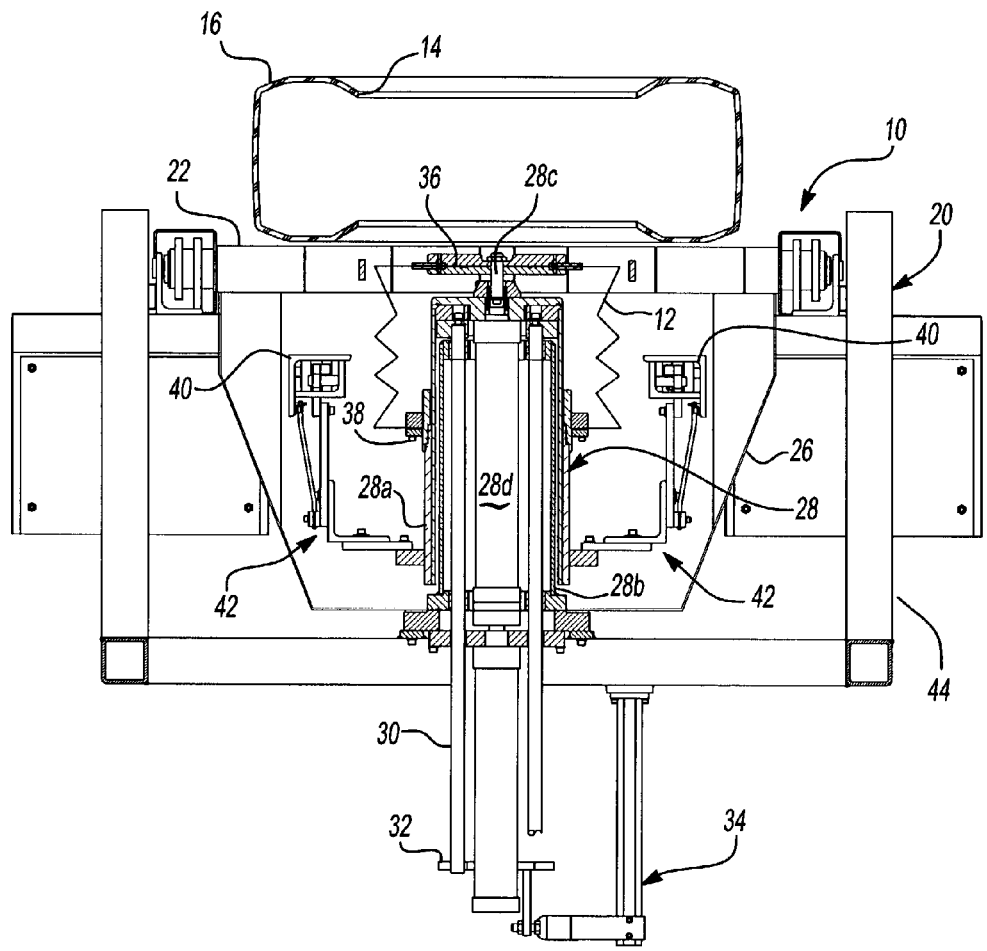
FIG. 2A is a plan view of a tire soaper according to the principles of the present invention, with the inflatable bladder in a retracted uninflated position.
Figure 2B:
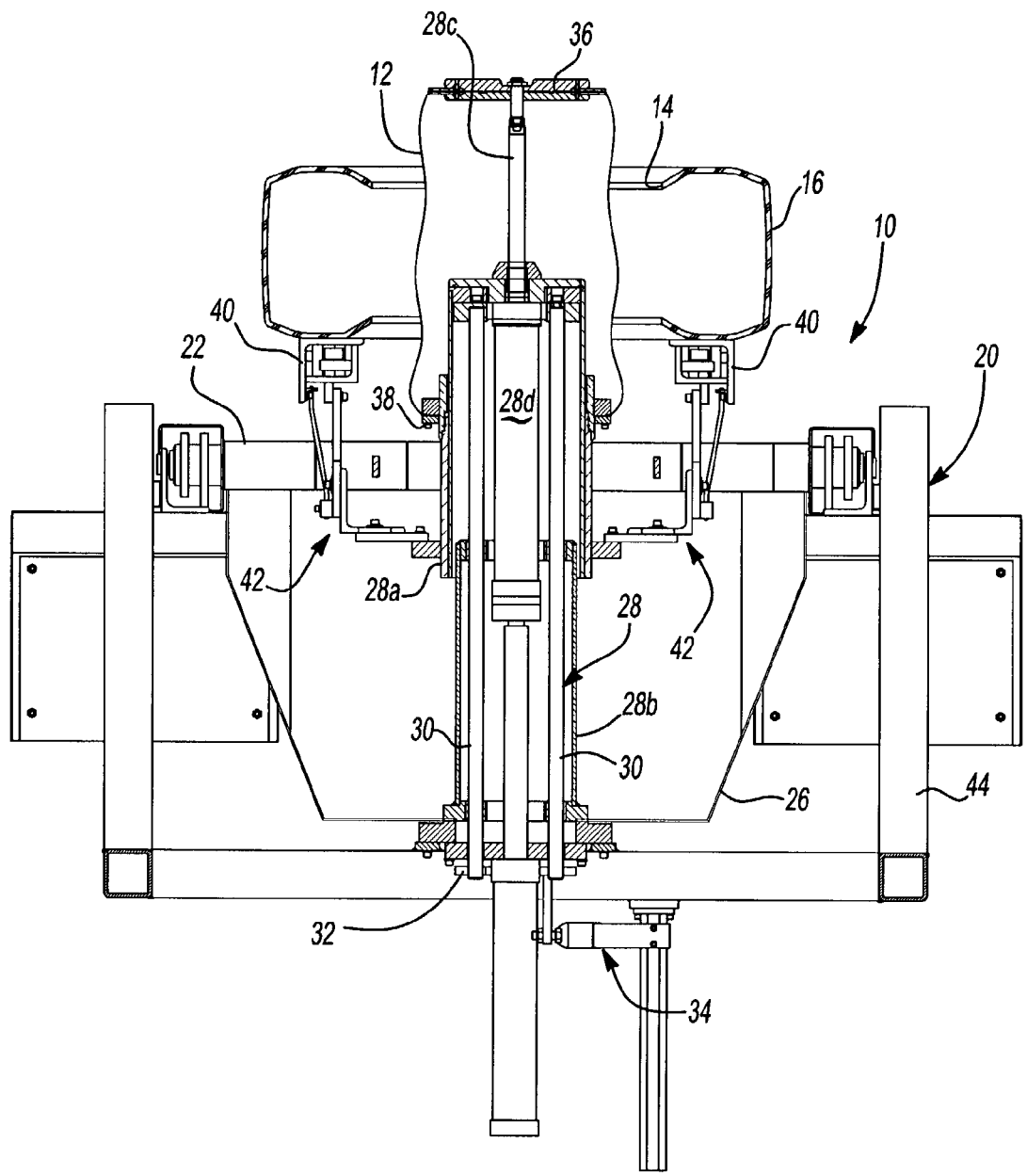
FIG. 2B is a plan view similar to FIG. 2A with the inflatable bladder in an extended position inside an opening in a tire.
Figure 2C:
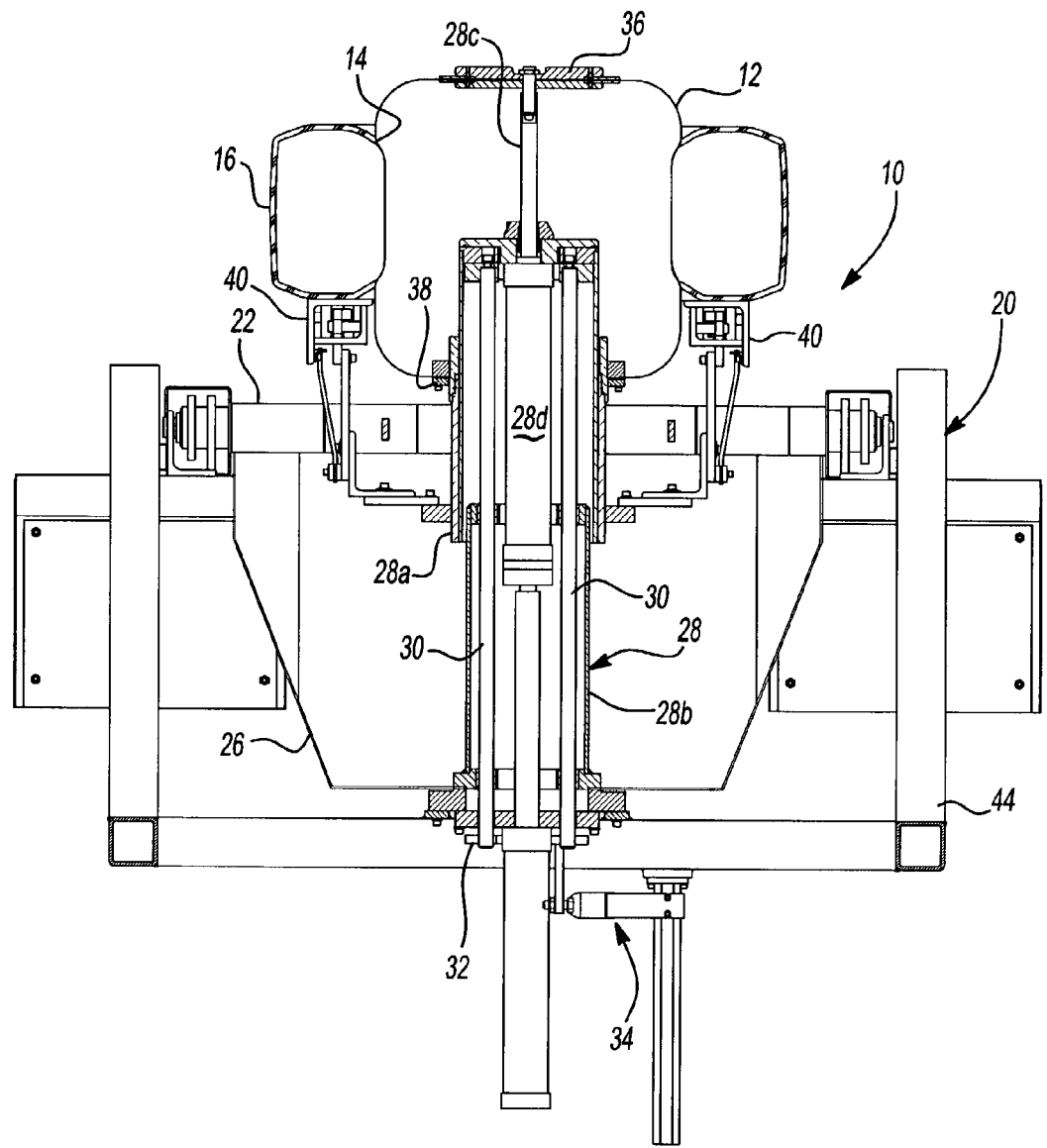
FIG. 2C is a plan view of the inflatable tire soaper shown in FIG. 2B with the bladder in the extended position within the opening in the tire and being inflated so as to come into contact with the tire according to the principles of the present invention.

The inflatable tire soaper 10 is disposed along a conveyer system 20 having a plurality of rollers 22 on which the tires 16 are conveyed along the conveyer system 20. As shown in FIGS. 2A–2C, the inflatable tire soaper 10 includes a soap tub 26 disposed beneath the bladder 12. The bladder 12 is mounted to a central support column 28 having a telescoping section including an outer cylinder portion 28a supported on a fixed intermediate cylinder 28b for axial movement relative thereto. The outer cylinder 28a is supported by a plurality of rods 30 which are attached to a drive plate 32. The drive plate 32 is connected to a slide actuator 34 for sliding the slide plate 32 in an axial direction along with the outer cylinder portion 28a. An extension arm 28c is slidably received in an inner cylinder 28d for axial movement relative thereto. A clamp plate 36 is mounted to an end of the extension arm 28c. The bladder 12 is connected at an upper end thereof to the clamp plate 36 and is connected to the outer cylinder portion 28a of the support column 28 by a retaining ring 38.

A pair of lift plates 40 are supported by the outer cylinder portion 28a of the support column 28 by a pair of bracket assemblies 42. The inflatable tire soaper 10 includes a frame assembly 44 that supports the support column 28 and tub 26. A pair of drive chains 46 are disposed on opposite sides of the support column 28, as best shown in FIGS. 1 and 4.

Figure 3:
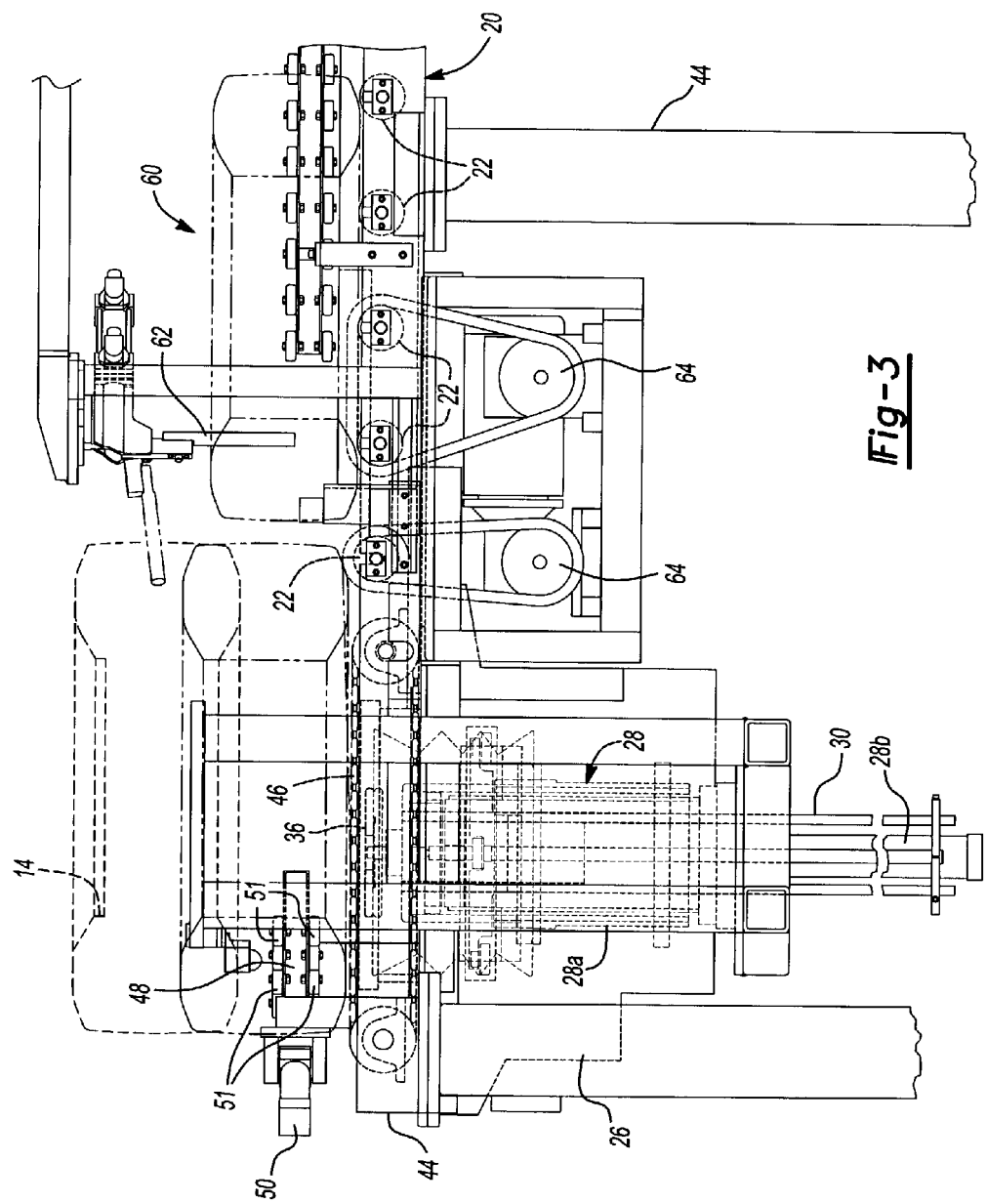
FIG. 3 is a side view of a conveyor system with an inflatable tire soaper according to the principles of the present invention.
Figure 4:
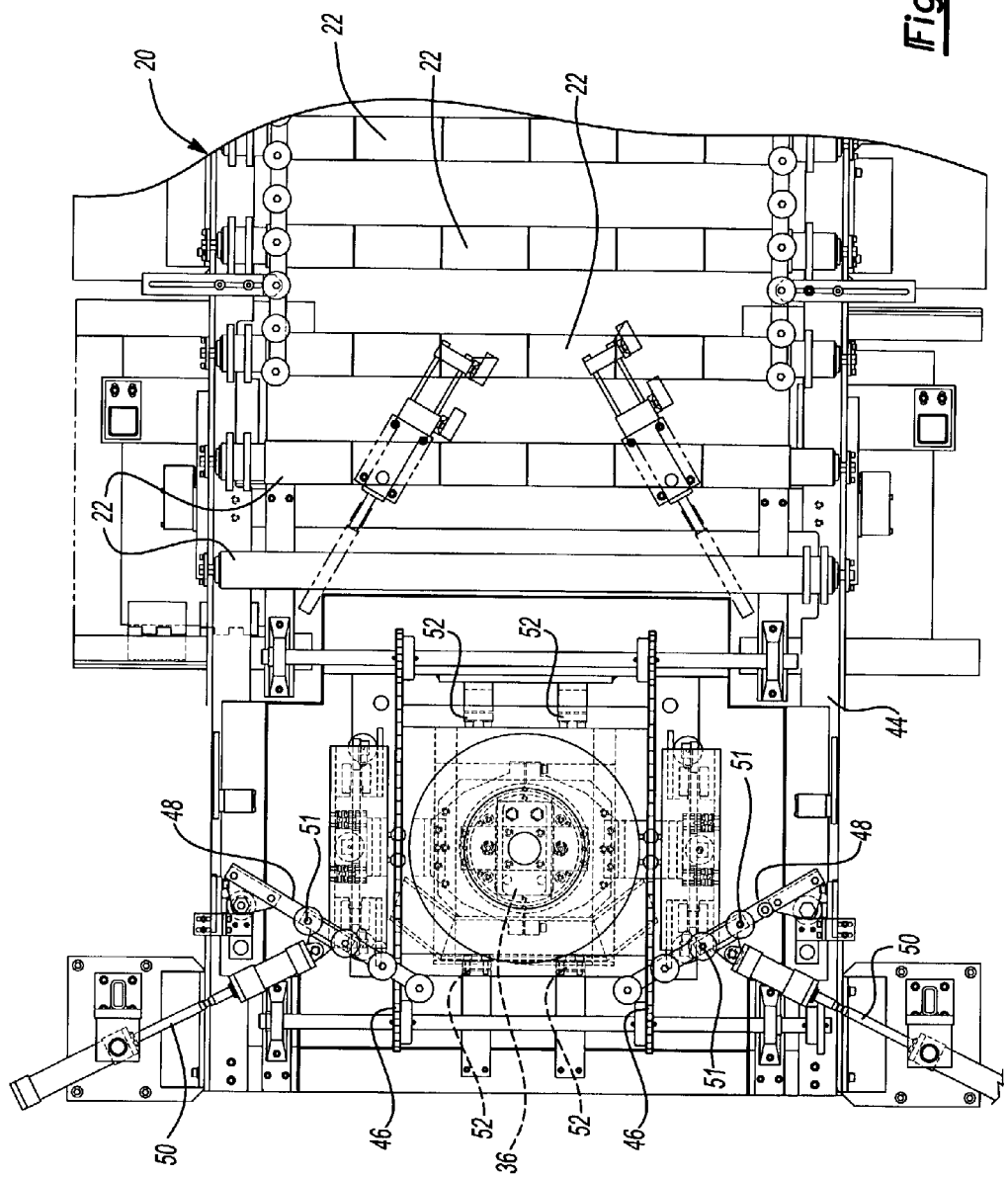
FIG. 4 is a top plan view of the conveyor system with an inflatable tire soaper according to the principles of the present invention.

As shown in FIGS. 3 and 4, a pair of pivot arms 48 are pivotally mounted to the frame 44. An air cylinder actuator 50 is connected to each of the pivot arms 48. Pivot arms 48 each include a plurality of rollers 51 mounted along a length thereof. The pivot arms 48 provide a stop and self-centering device for a tire 16 which is delivered along the conveyor system 20 and carried by the chain drive mechanisms 46 until the tire 16 engages the pivot arms 48. The chain drives 46 force the tire 16 against the rollers 52 of the pivot arms 48 while the pivot arms 48 act as a wedge for properly centering the tire above the bladder 12.

When the tire 16 is properly located, the pneumatic lift mechanism 34 is activated to lift the drive plate 32 which lifts the outer cylinder 28a along with extension arm 28c and clamp plate 36 up through the center hole 14 in the tire 16. As the outer cylinder portion 28a extends vertically, the lift plates 40 also move upward into contact with the lower surface of the tire 16 thereby lifting the tire 16 off of the drive chains 46. The extension arm 28c is then extended by application of pressurized air to the inner cylinder portion 28*d* causing the extension arm to extend above the upper surface of the tire 16 and stretching the bladder 12 therewith (FIG. 2B). Pressurized air is then delivered to the interior surface of the bladder 12 causing the bladder to expand outward into contact with the inner peripheral surface around the opening 14 in the tire 16 (FIG. 2C). An air passage is provided through one of the rods 30 for providing air or vacuum to the bladder 12. A fitting (not shown) is mounted to the rod 30 for attachment of an air vacuum supply hose.

As best shown in FIG. 4, a plurality of spray jets 52 are provided for spraying soap onto the exterior surface of the bladder 12 while it is in the retracted position. Excess soap that drips from the bladder 12 is caught by the tub 26 and is then collected and re-supplied to the sprayers 52.

As the bladder 12 is inflated, the wet surface of the bladder 12 contacts the surface of the tire 16 at both the upper and lower openings in order to evenly distribute soap to the portion of the tire that engages the wheel when mounted. After the bladder 12 has been inflated, the bladder 12 is then deflated and the central support column 28 is retracted, thereby retracting the tire lift plates 40 which thereby lower the tire 16 onto the drive chain mechanism 46. The pivot arms 48 are then retracted by the air cylinder actuators 50. The drive chain mechanism 46 then drives the soaped tire 16 to the next stage of the tire mounting assembly process, as is known in the art.

As shown in FIG. 3, the conveyer system 20 includes a waiting station 60 including a pair of stop arms 62 which stop the tires in the waiting station 60 until the previous tire has been properly soaped by the inflatable tire soaper 10. When one tire rolls away from the inflatable tire soaper 10, the stop arms 62 are retracted to the retracted position as illustrated in phantom, to allow the next tire 16 to move forward to the inflatable tire soaper 10. Drive motors 64, 66 are provided for controlling operation of the rollers 22 of the conveyer system 20.

The inflatable tire soaper 10 is provided with a control system which controls the air cylinder actuators 34, 29, and 50 and controls the drive motors 64, 66 for driving the rollers 22 of the conveyer 20 as well as the chain drive mechanism 46.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tire soaper, comprising:
  a bladder expandable between an un-inflated position and an inflated position;
  a wetting device adapted to apply a liquid to a surface of said bladder;
  an inflation device attached to said bladder for causing the bladder to inflate to the inflated position, said bladder being adapted to contact a surface of a tire; and
  a conveyor system adapted to transport the tire to a position disposed in a generally centered position relative to an axial position of said bladder.

2. The tire soaper according to claim 1, wherein said conveyor system includes a position stop switch for engagement by the tire on said conveyor system to stop said conveyor system when the tire is positioned above said bladder.

3. The tire soaper according to claim 1, wherein said conveyor system includes a tire lift mechanism for lifting the tire when positioned above said bladder.

4. The tire soaper according to claim 1, further comprising an extension mechanism attached to an end of said bladder, said extension mechanism being extendable from a retracted position to an extended position, wherein said bladder is adapted to be extended through a central opening in the tire when said extension mechanism is in said extended position.

5. The tire soaper according to claim 4, further comprising upper and lower clamping devices attached to said extension mechanism, said upper and lower clamping devices being attached to said bladder.

6. The tire soaper according to claim 4, wherein said extension mechanism is connected to a fluid actuated lift mechanism.

7. The tire soaper according to claim 1, wherein said wetting device includes a plurality of sprayers for spraying the liquid on said bladder.

8. The tire soaper according to claim 1, further comprising a vessel disposed below said bladder for receiving liquid dripping from said bladder.

9. The tire soaper according to claim 8, wherein said wetting device receives liquid from said vessel.

10. A tire soaper for soaping a portion of a tire that contacts a wheel when assembled thereon, the tire soaper comprising:
  a bladder expandable between an un-inflated position and an inflated position;
  a wetting device adapted to apply a liquid to a surface of said bladder;
  an inflation device attached to said bladder for causing the bladder to inflate to the inflated position, said bladder being adapted to extend through an opening in the tire without contacting the tire while un-inflated and, when inflated, expands outward to contact the portion of the tire that contacts a wheel when assembled; and
  an extension mechanism attached to an end of said bladder, said extension mechanism being extendable from a retracted position to an extended position, wherein said bladder is adapted to be extended through a central opening in the tire when said extension mechanism is in said extended position.

11. The tire soaper according to claim 10, further comprising a conveyor system adapted to transport the tire to a position disposed in a generally centered position relative to an axial position of said bladder.

12. The tire soaper according to claim 11, wherein said conveyor system includes a position stop switch for engagement by a tire on said conveyor system to stop said conveyor system when the tire is positioned above said bladder.

13. The tire soaper according to claim 12, further comprising upper and lower clamping devices attached to said extension mechanism, said upper and lower clamping devices being attached to said bladder.

14. The tire soaper according to claim 11, wherein said conveyor system includes a tire lift mechanism for lifting the tire when positioned above said bladder.

15. The tire soaper according to claim 10, wherein said extension mechanism is connected to a fluid actuated lift mechanism.

16. The tire soaper according to claim 10, wherein said wetting device includes a plurality of sprayers for spraying the liquid on said bladder.

17. The tire soaper according to claim 10, further comprising a vessel disposed below said bladder for receiving liquid dripping from said bladder.

18. The tire soaper according to claim 17, wherein said wetting device receives liquid from said vessel.

* * * * *